(12) United States Patent
Jaeger

(10) Patent No.: US 9,205,498 B2
(45) Date of Patent: Dec. 8, 2015

(54) MODULAR DRILL WITH DEFINED SIDE SUPPORT

(75) Inventor: Horst Manfred Jaeger, Nürnberg (DE)

(73) Assignee: KENNAMETAL INC., Latrobe, PA (US)

( * ) Notice: Subject to any disclaimer, the term of this patent is extended or adjusted under 35 U.S.C. 154(b) by 812 days.

(21) Appl. No.: 13/173,453

(22) Filed: Jun. 30, 2011

(65) Prior Publication Data

US 2012/0003056 A1 Jan. 5, 2012

(30) Foreign Application Priority Data

Jun. 30, 2010 (DE) .......................... 10 2010 025 653

(51) Int. Cl.
*B23B 51/02* (2006.01)

(52) U.S. Cl.
CPC ............. *B23B 51/02* (2013.01); *B23B 2251/02* (2013.01); *B23C 2210/02* (2013.01); *Y10T 408/892* (2015.01); *Y10T 408/9097* (2015.01); *Y10T 408/9098* (2015.01)

(58) Field of Classification Search
CPC ..................... B23B 2251/02; B23B 2205/02
USPC ................. 408/226–227, 230–233, 713
See application file for complete search history.

(56) References Cited

U.S. PATENT DOCUMENTS

| | | | |
|---|---|---|---|
| 3,548,688 A * | 12/1970 | Kuch ........................... | 408/230 |
| 5,957,631 A | 9/1999 | Hecht | |
| 6,485,235 B1 * | 11/2002 | Mast et al. ..................... | 408/1 R |
| 6,506,003 B1 * | 1/2003 | Erickson ....................... | 408/226 |
| 7,306,410 B2 * | 12/2007 | Borschert et al. ............. | 408/144 |
| 7,625,161 B1 * | 12/2009 | Ruy Frota de Souza ..... | 408/227 |
| 7,832,967 B2 * | 11/2010 | Borschert et al. ............ | 408/231 |
| 7,972,094 B2 * | 7/2011 | Men et al. ..................... | 408/231 |
| 8,142,116 B2 * | 3/2012 | Frejd ............................. | 408/231 |
| 2005/0084352 A1 * | 4/2005 | Borschert et al. ............ | 408/226 |
| 2006/0093449 A1 * | 5/2006 | Hecht et al. .................. | 408/231 |
| 2008/0193237 A1 * | 8/2008 | Men et al. ..................... | 408/226 |
| 2009/0116920 A1 * | 5/2009 | Bae ............................... | 408/227 |
| 2009/0311060 A1 * | 12/2009 | Frejd ............................. | 408/200 |
| 2010/0143059 A1 * | 6/2010 | Hecht ............................ | 408/200 |
| 2010/0266357 A1 * | 10/2010 | Kretzschmann et al. ..... | 408/204 |
| 2010/0322729 A1 * | 12/2010 | Pabel ............................ | 408/200 |

FOREIGN PATENT DOCUMENTS

| | | |
|---|---|---|
| CN | 1258240 A | 6/2000 |
| CN | 1364676 A | 8/2002 |
| CN | 1630569 A | 6/2005 |
| CN | 101048251 A | 10/2007 |

(Continued)

OTHER PUBLICATIONS

Jun. 6, 2014.

(Continued)

*Primary Examiner* — Eric A Gates
*Assistant Examiner* — Paul M Janeski
(74) *Attorney, Agent, or Firm* — Larry R. Meenan

(57) ABSTRACT

A rotary cutting tool has a shank and an interchangeable cutting tip which can be coupled to the shank. The shank has a locking geometry having an undercut into which a locking projection of the cutting tip projects. Numerous lateral supporting surfaces and supporting counter-surfaces are provided for laterally fixing the cutting tip in the shank.

21 Claims, 6 Drawing Sheets

(56) References Cited

FOREIGN PATENT DOCUMENTS

| CN | 101610866 | A | | 12/2009 |
|----|-----------|---|---|---------|
| EP | 0984841 | A1 | | 3/2000 |
| JP | 2005169542 | A | * | 6/2005 |
| WO | 2006/046227 | A1 | | 5/2006 |

OTHER PUBLICATIONS

State Intellectual Property Office of the People's Republic of China, "Notification of the Second Office Action with English language translation", CN Application No. 201110107700.7, Jan. 14, 2015, 16 pp.

* cited by examiner

MODULAR DRILL WITH DEFINED SIDE SUPPORT

BACKGROUND

1. Field of the Invention

The invention relates to a rotary cutting tool, in particular a drill, comprising a shank and an interchangeable cutting tip which can be coupled to the shank in a form-fitting manner.

2. Background Information

An example of a known cutting tool having an interchangeable cutting tip is described in WO 2006/046227 A1. The cutting tips, as soon as they have become severely worn, are removed from the shank in a nondestructive manner using a tool and are replaced by a new cutting tip. The cutting tip is fastened by means of form-fitting locking, similar to a bayonet catch, in which an undercut against the direction of rotation is provided in the shank, into which undercut a locking projection of the cutting tip projects during the rotary locking. The rotary movement is likewise transmitted to the cutting tip via a form fit. To absorb lateral cutting forces, a supporting surface is provided in the region of the rear-side end of the cutting tip, to be more precise in the region of the locking geometry. The cutting tip has a cylindrical section axially between the locking surface and the drill point, the cylindrical said section being at a slight distance from the shank via a gap.

EP 0 984 841 B1 shows an alternative embodiment of a known cutting tool having an interchangeable cutting tip, wherein a small, stub-like pre-centering extension projects from the rear-side end face of the cutting tip. The pre-centering extension performs the task of roughly centering the cutting tip relative to the shank.

Although generally suitable for their intended uses, there is still room for improvements in such cutting tools, particularly in improving the locking of the cutting tip in the cutting tool.

SUMMARY OF THE INVENTION

Deficiencies in the prior art are addressed by embodiments of the present invention. As one embodiment of the invention, a rotary cutting tool, which in particular is designed as a drill, having a shank and an interchangeable cutting tip which can be coupled to the shank in a form-fitting manner is provided. The shank has a locking geometry having an undercut against the direction of rotation, into which undercut a locking projection of the cutting tip projects, in order to secure the cutting tip axially to the shank. Furthermore, the shank has a lateral first supporting surface lying axially offset from the locking geometry and a lateral second supporting surface lying axially in the region of the locking geometry, wherein a first counter-surface and a second counter-surface, respectively, of the cutting tip bear with an interference fit against the supporting surfaces.

In the example cutting tool according to an embodiment of the invention, the lateral cutting forces are absorbed not only by supporting surfaces in the region of the locking projection but also additionally, axially offset therefrom, by a first supporting surface, such that the first and the second supporting surfaces interact. The interference fit at the two supporting surfaces ensures that both supporting surfaces also have a supporting effect when the cutting tip is exchanged and in the face of the production tolerances which inevitably occur. The support is effected in the assembled state even if lateral forces are still not exerted on the cutting tool.

According to a preferred embodiment of the present invention, the first and the second supporting surfaces lie substantially within the same diameter range. In particular, they are at most at a distance from one another which is less than 15% of the diameter of the larger of the two supporting surfaces.

At least one supporting surface, and preferably both supporting surfaces, is/are formed by a plurality of supporting sections circumferentially separate from one another. Between the supporting sections of each or of one of the supporting surfaces, there is no contact between the cutting tip and shank. This can be achieved either by an axial groove in the shank or by an axial slot.

The supporting surfaces are preferably arranged diametrically opposite one another. In addition, in the preferred embodiment, only two supporting sections are provided.

The interference fit is achieved relatively simply in particular by the shank having axially projecting fingers, on the radial inner side of which at least the second supporting surface, preferably both supporting surfaces are provided. As a result of these axial fingers, which are circumferentially separate from one another, certain radial flexibility is achieved, such that the fingers are easily bent elastically radially outward when the cutting tip is fastened.

The elasticity is achieved to a special degree owing to the fact that, according to one embodiment, the fingers have an axial length which is greater than/equal to, preferably at least twice as large as, the radial finger thickness.

In addition, the locking geometry should also be formed on the fingers.

At least the first supporting surface and the first counter-surface, alternatively or additionally also the second surfaces, can have geometries which deviate from one another as viewed in the axial direction. These geometries are designed in such a way that the counter-surface exerts an increasing radial pressure on the first supporting surface during the rotary locking, that is to say when the cutting tip is being fastened to the shank. In this connection, however, a deviating geometry does not mean to provide merely different dimensions in the same shape. On the contrary, a deviating geometry means that the counter-surface on the cutting-tip side is moved increasingly closer to the supporting surface during the rotary locking in order to finally strike it and press it increasingly outward in order to ensure the interference fit.

An example of such a pair of different geometries consists in the fact that at least the first supporting surface has the geometry of a circular cylinder segment and the corresponding counter-surface has a geometry bulging radially outward relative to a circular cylinder segment as viewed in the axial direction. Such a geometry bulging outward can be realized, for example, by an ellipse segment in which the counter-sections opposite the supporting sections in the unlocked position are at a smaller distance from the axis of rotation than the circular cylinder segment, and the bulging-out section is at a maximum distance from the axis of rotation which is greater than that of the circular cylinder segment. Of course, both surfaces, that is to say the supporting surface and its counter-surface, could also have geometries differing from a circular cylinder, or the counter-surface could have a circular cylinder segment, whereas the supporting surface is of elliptical design.

Where numerous exchanges of drill points are carried out on the same shank, it is important that the wear of the components is slight and that, both with a shank in new condition and with a highly worn shank, firstly the exchange takes place easily and reliable locking is also constantly ensured. In order to be able to meet these different requirements, the first supporting surface has an insertion slope in the rotary locking direction. This insertion slope avoids crushing or catching when locking a drill point on a new shank.

The locking projection, as viewed in the radial direction, preferably runs in a wedge shape in the circumferential direction; that is to say, the wedge extends in the direction toward the locking geometry. Additionally or alternatively, the locking projection bears against an axial stop surface, running in the circumferential direction, on the shank. In this connection, the locking geometry should as far as possible ensure an axial restraint between the shank and the cutting tip, to be precise possibly only at an axial stop surface, so that double fits do not occur.

The axial stop surface can merge into an engagement slope which lies in front of the stop surface in the rotary locking direction so that easy locking of drill points on new shanks is also ensured in this region.

The preferred embodiment provides for the axial stop surface to be a section of a step on the finger, said step projecting freely in the circumferential direction.

The second supporting surface should lie closer to the drill point than the first supporting surface, which is made possible by the provision of a supporting pin, projecting on the rear side, on the cutting tip, on which supporting pin the first supporting surface is provided.

A centering pin provided with a smaller diameter, that is to say smaller than that of the supporting pin, can also project from the supporting pin on the rear side, said centering pin engaging in a matching opening in the shank and thus pre-centering the cutting tip upon insertion. However, this centering pin has a clearance fit relative to the corresponding opening in the shank in order to eliminate double fits.

The axial length and/or the area of the first supporting surface is greater than that of the second supporting surface.

In addition, the first and second supporting surfaces should as far as possible directly adjoin one another in the axial direction and are at most separated from one another by a small step. This step could be formed by a bevel.

BRIEF DESCRIPTION OF THE DRAWINGS

A full understanding of the invention can be gained from the following description of the preferred embodiments when read in conjunction with the accompanying drawings in which.

Parts corresponding to one another are provided with the same designations in all the figures.

DESCRIPTION OF THE PREFERRED EMBODIMENTS

Figure 1:
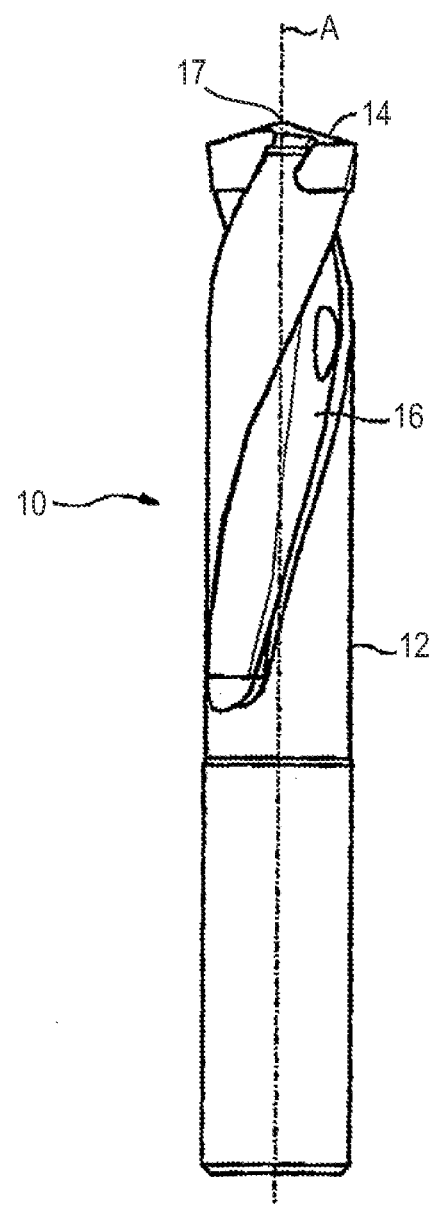
FIG. 1 shows a side view of a rotary cutting tool according to the invention composed of a shank and an interchangeable cutting tip.

FIG. 1 shows a rotary cutting tool 10 in the form of a drill, having a shank 12 and a cutting tip 14, which are both produced as separate parts. The cutting tip can be fastened to the shank 12 in a detachable and interchangeable manner. Similarly, the rotary cutting tool can also be designed as a countersinking, milling or reaming tool.

The cutting tool 10 has a flute 16 which extends over the shank 12 and the cutting tip 14, which also has the drill point 17.

Figure 2:
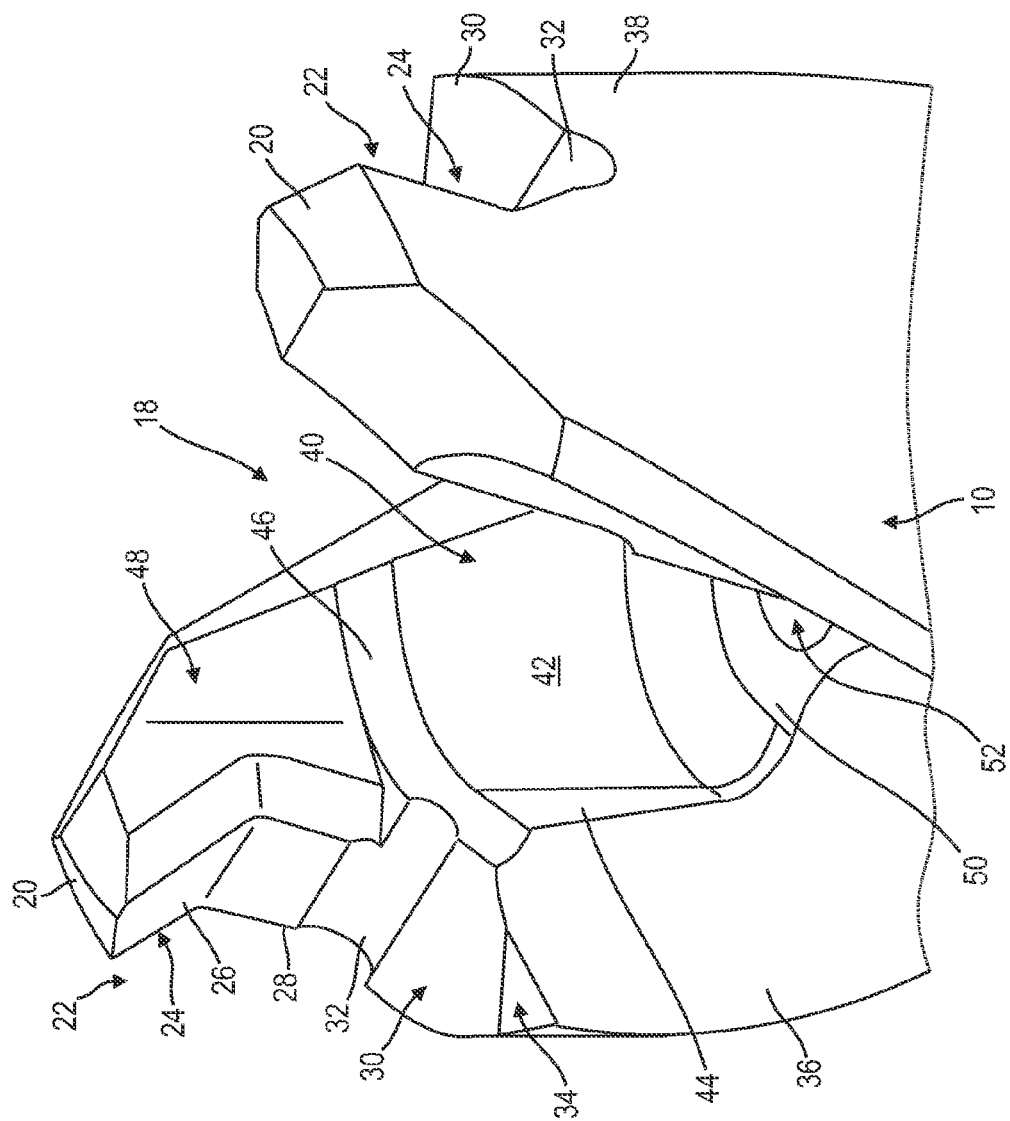
FIG. 2 shows a perspective view of the tip-side end of the shank in FIG. 1.

The tip-side end of the shank 12 can be seen in FIG. 2, the shank 12 being split by an axial slot 18 into two axially projecting fingers 20. The axial slot 18 is in this case arranged in such a way that it merges into the flute 16.

The fingers 20 have "locking geometries" 22 in the circumferential direction. These locking geometries 22 have undercuts 24 against the direction of rotation of the cutting tool 10. As will be explained later, corresponding locking projections of the cutting tip 14 come into engagement with these undercuts 24 in order to lock the cutting tip 14 on the shank 12.

The undercuts 24 are preferably formed by planar surfaces 26, 28 which run toward one another in the circumferential direction, such that, as viewed in the radial direction, each undercut 24 runs in a wedge shape.

In addition, the fingers 20 have, broadly speaking approximately at the center of the axial extent thereof, axial stop surfaces 30 which face the subsequent drill point 17. These stop surfaces 30 are oriented in particular at a right angle to the center axis A (see FIG. 1) of the cutting tool 10.

The stop surfaces 30 preferably lie outside the undercut 24 and are separated from the latter via an axially and radially running groove 32.

On its end opposite the undercut 24, each stop surface 30 merges into an "engagement slope" 34, which forms, as it were, the transition of the stop surface 30 to a side wall 36 of the finger 20. The engagement slope 34 can be designed, for example, as a beveled or preferably rounded-off edge. As will be explained later, it is intended to prevent or reduce damage to the cutting tip 14 during insertion and locking on the shank 12.

The side wall 36 runs, with respect to FIG. 2, obliquely downward in the axial direction to the shank end and also in the direction of the undercut 24. The side wall 36 together with the stop surface 30, as viewed in the radial direction toward the axial center (see FIG. 5), therefore forms a step 38 which projects freely in the circumferential direction.

The stop surface 30 divides each finger 20 into a bottom, first section and a top (tip-side), second section.

In the region between the diametrically opposite fingers 20, the shank 12 has a cylindrical locating opening 40 for the cutting tip 14. The bottom, first part of this opening is formed by a first supporting surface 42 which is formed on the fingers 20 radially on the inside and which, on account of the slot 18, is subdivided into two circumferentially separate first supporting sections. One supporting section is provided, as it were, on one finger 20 and the other diametrically opposite supporting section is provided on the other finger 20. Both first supporting sections together form the first supporting surface 42. In the locking direction, an insertion slope 44 running obliquely and radially outward is provided at the start of each "first supporting section", said insertion slope 44 forming, as it were, the transition between the first supporting section and the side wall 36.

In the axial direction at the level of the stop surface 30, the first supporting surface 42 merges with a slight, sloping step 46 into the "second supporting surface" 48, which is likewise formed on the fingers 20 radially on the inside but lies axially at the level of the locking geometry 22. Here, too, on account of the slot 18, the second supporting surface 48 is subdivided into two sectional surfaces, which are called second supporting sections below. These second supporting sections also lie diametrically opposite one another. The slot 18 ends in the axial direction at a preferably plane base surface 50, which has a centering opening 52.

With respect to FIG. 2, it should also be mentioned that the supporting surfaces 42, 48 lie substantially within the same diameter range, that is to say that they deviate radially from one another at most only slightly. In the example shown, the second supporting surface 48 lies radially somewhat further on the outside than the first supporting surface 42. Apart from that, the second supporting surface 48 is smaller and axially shorter than the first supporting surface 42.

Figure 3:
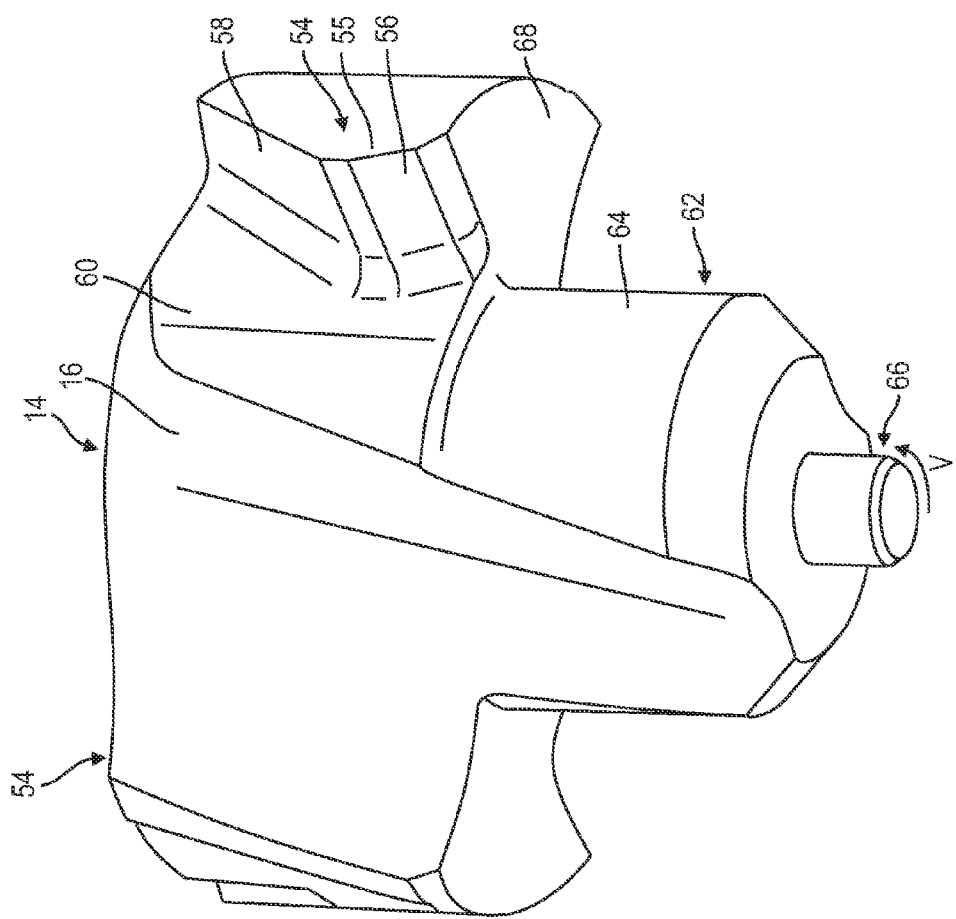
FIG. 3 shows a perspective view of the cutting tip of the rotary cutting tool according to FIG. 1.

FIG. 3 shows the cutting tip 14, which is produced from a harder material than the shank. Suitable materials for the cutting tip 14 are in particular carbide, cermet, ceramic and HSS, in each case coated or uncoated, although tipping with PCD or CBN is also possible. The cutting tip 14 can be produced by metal injection molding (MIM process) or can be finish-machined in a conventional manner by grinding.

The cutting tip 14 has an axially obliquely running recess, which forms the flute 16, and two radially projecting lobes 54, which have the cutting edges. In the rotary locking direction V (the rotary locking direction is opposed to the subsequent direction of rotation of the tool), the lobes 54 have locking projections 55, which, as viewed in the radial direction, run in a wedge shape in the circumferential direction. Each projection 55 is oriented toward the locking geometry 22 and its surfaces 56, 58 are preferably adapted in their inclination to the surfaces 28 and 26, respectively. In the rotary locking direction V in front of the lobes 54, the cutting tip 14 has a preferably cylindrical supporting counter-surface 60, which is formed by two first supporting counter-sections, namely in each case a section in front of the respective lobe 54. In the locked state, this supporting counter-surface 60 bears against the second supporting surface 48 of the shank 12 and is therefore designated as second supporting counter-surface 60.

A "supporting pin" 62 is integrally formed on that side of the lobe 54 which faces axially away from the drill point 17. In the locked state, this supporting pin 62 lies in the region of the first supporting surface 42 and therefore has a first supporting counter-surface 64, which is subdivided by the flute 16 into two second supporting counter-sections.

The supporting pin 62 has an elliptical cross section as viewed in the axial direction, said cross section being interrupted only by the two flutes 16, whereas the supporting surfaces 42 form a circular cylinder, to be more precise, on account of the slot 18, circular cylinder segments. With respect to the elliptical geometry, it should also be mentioned that the major axis of the ellipse coincides approximately with the center of the first supporting counter-sections. The minor axis of the ellipse thus falls within the region of the flute 16 (see FIG. 6).

That side of the supporting pin 62 which faces away from the drill point 17 has a centering pin 66, which has a markedly smaller diameter than the supporting pin 42. The centering opening 52, into which the centering pin 66 penetrates, is provided for pre-centering with an oversize relative to the centering pin 66.

Figure 4:
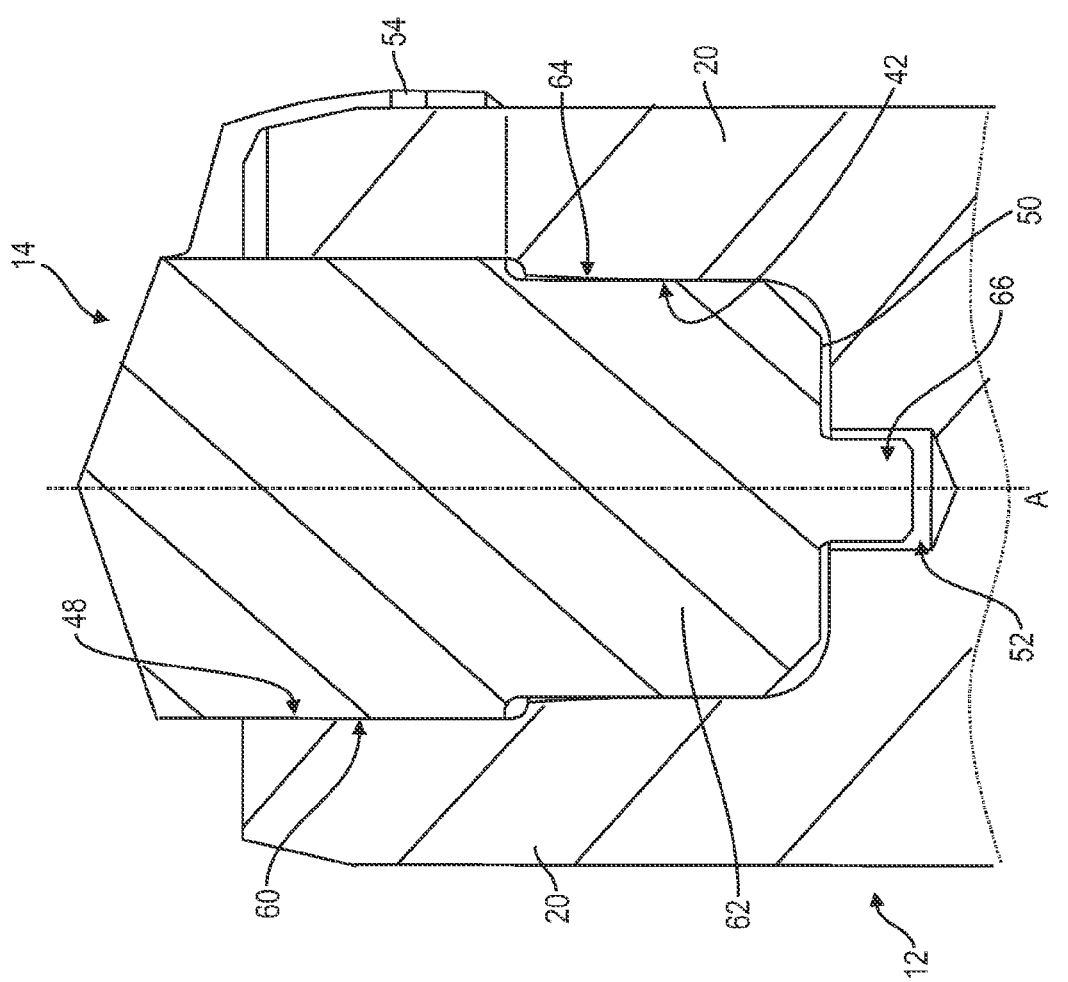
FIG. 4 shows an axial section through the rotary cutting tool according to FIG. 1.

FIG. 4 shows the shank 12 with inserted cutting tip 14, where it can be seen that, on the one hand, the centering pin 66 lies with clearance in the corresponding centering opening 52 and that, on the other hand, the cutting tip 14 is held free of clearance in the shank 12 both laterally via the first supporting surface 42 and via the second supporting surface 48 by these surfaces bearing with an interference fit against the first and the second supporting counter-surfaces 64 and 60, respectively. The bearing contact runs in this case even preferably right up to the free end of the fingers 20.

It can also be seen that the radially outermost sections of the lobes 54 project laterally relative to the fingers 20. The axial mounting cannot be seen in FIG. 4, said axial mounting being achieved by the surface 68 bearing on the stop surface 30, said surface 68 lying in FIG. 3 on the underside of the lobes 54. However, the base surface 50 is at a small distance from the bottom end face of the supporting pin 62 (see FIG. 4).

Figure 5:
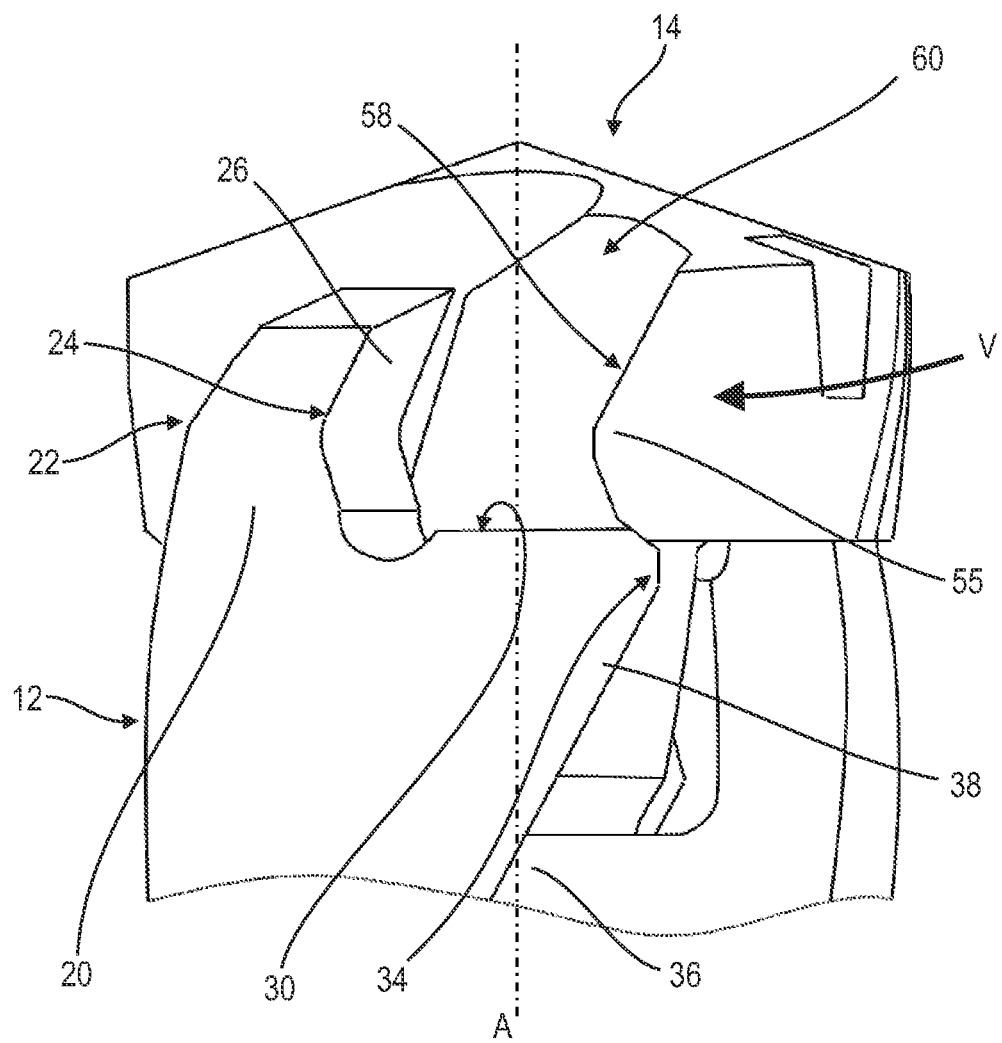
FIG. 5 shows a side view of the tip of the rotary cutting tool according to the invention, with cutting tip still unlocked.

FIG. 5 shows the cutting tip 14 in the shank 12 in the still unlocked, but already inserted position. It can be seen that the engagement slope 34 makes it easier for cutting tips 14 to be rotated in locking direction V, even in the case of unused shanks 12. Apart from that, the locking is also improved by the insertion slope 44 in the region of the first supporting surface 42.

When the cutting tip 14 is rotated in rotary locking direction V, the locking projection 55 engages in the assigned undercut 24, such that the two parts are locked together in the axial direction. As a result, the cutting tip 14 is secured to the shank 12, and the torque from the shank 12, which is required for drilling or milling, can be transmitted to the cutting tip 14. The two surfaces 58 and 26 are positioned axially relative to one another in such a way that, during the locking, an axial clamping force is exerted on the cutting tip 14, which presses the cutting tip 14 against the stop surface 30.

Furthermore, during the locking, the second supporting counter-surface 60 lying in front of the locking projection 55 moves behind the associated finger 20 and presses against the second supporting surface 48.

Figure 6:
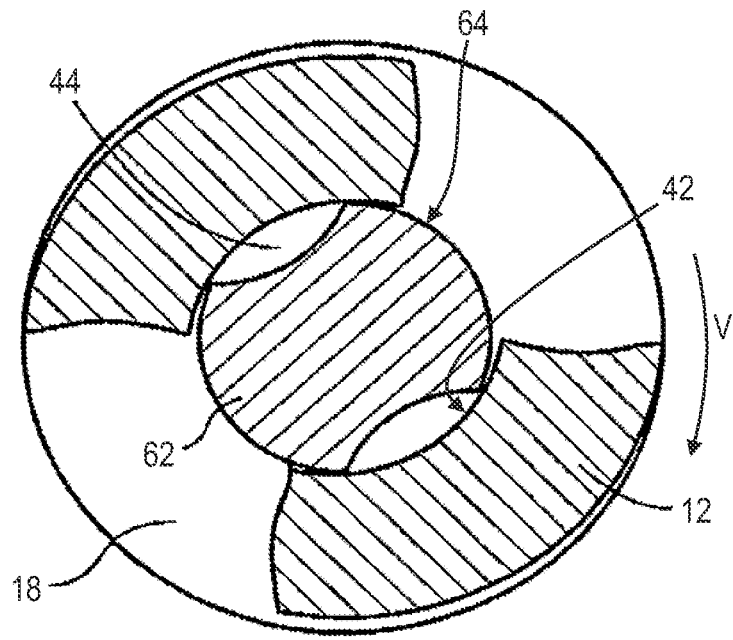
FIG. 6 shows a radial section of the cutting tool according to the invention, with inserted, unlocked cutting tip.
Figure 7:
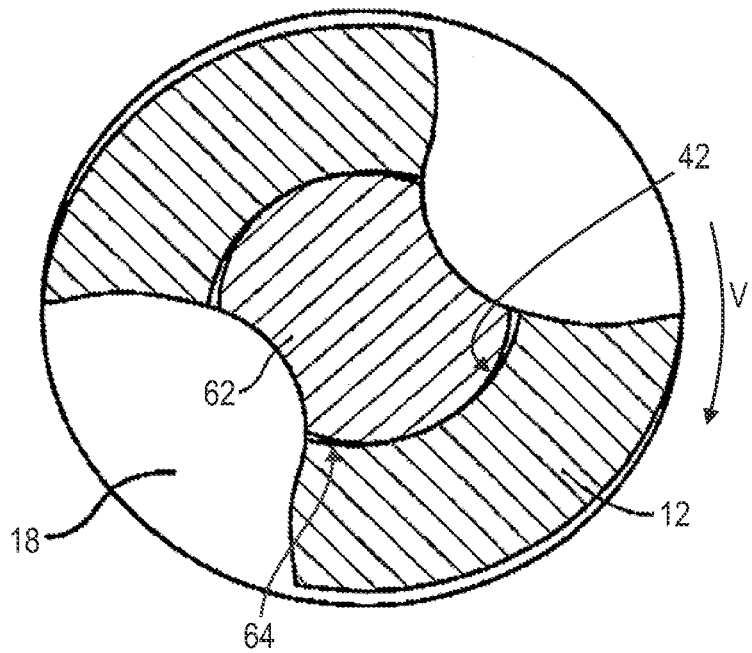
FIG. 7 shows a radial section of the cutting tool according to the invention, with inserted cutting tip in the locked position.

The supporting surface 42 also bears, in the locked state, with an interference fit against the first supporting counter-surface 64, as shown with the aid of FIGS. 6 and 7. As stated, the supporting pin 62 has an elliptical geometry and is inserted with the major axis of the ellipse oriented toward the slot 18. This unlocked state is shown in FIG. 6. In this case, there is at most slight contact, but not yet any interference fit, between the supporting pin 62 and the fingers 20.

However, during the rotation in the locking direction (see FIG. 7), the major axis of the ellipse moves between the fingers 20. Since the length of the major axis of the ellipse is greater than the diameter of the first supporting surface 42, the supporting pin 62 presses the fingers 20 radially slightly outward, such that, here, too, an interference fit is formed between the first supporting surface 42 and the first supporting counter-surface 64. During the locking, the radial force exerted on the fingers 20 therefore increases (cf. FIGS. 6 and 7).

As a result of the fingers 20, which are circumferentially separate from one another, certain radial flexibility is achieved, for which reason the fingers 20, as already mentioned, are easily bent elastically radially outward in the case of a fixed cutting tip 14.

To achieve sufficient elasticity, the fingers 20 have an axial length which is greater than or equal to, preferably at least twice as large as, the radial finger thickness. The fingers 20 therefore have an elongated shape in the axial direction.

The centering pin 66 serves merely for pre-centering during the insertion of a new cutting tip 14. No force is transmitted via the centering pin 66 during the cutting operation.

While specific embodiments of the invention have been described in detail, it will be appreciated by those skilled in the art that various modifications and alternatives to the details provided herein could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

What is claimed is:

1. A rotary cutting tool comprising:
a shank; and
an interchangeable cutting tip which can be coupled to the shank in a form-fitting manner,
wherein the shank has a locking geometry having an undercut against a direction of rotation, into which undercut a locking projection of the cutting tip projects in order to secure the cutting tip axially to the shank;
wherein the shank has a lateral, inward facing, first supporting surface lying axially offset from the locking geometry and a lateral, inward facing, second supporting surface lying axially in the region of the locking geometry, against which supporting surfaces a first counter-surface and a second counter-surface, respectively, of the cutting tip bear with an interference fit; and
wherein the axial length and/or area of the first supporting surface is greater than that of the second supporting surface.

2. The rotary cutting tool as recited in claim 1, wherein at least one of the supporting surfaces is formed by a plurality of supporting sections circumferentially separate from one another and/or at least one of the counter-surfaces is formed by a plurality of counter-sections circumferentially separate from one another.

3. The rotary cutting tool as recited in claim 2, wherein the plurality of supporting sections and/or the plurality of counter-sections are disposed diametrically opposite.

4. The rotary cutting tool as recited in claim 1, wherein the shank comprises axially projecting fingers, on the radial inner side of which at least the second supporting surface is provided.

5. The rotary cutting tool as recited in claim 4, wherein each of the fingers have an axial length and a radial thickness and wherein the axial length is greater than or equal to the radial finger thickness.

6. The rotary cutting tool as recited in claim 4, wherein the locking geometry is formed on the fingers.

7. The rotary cutting tool as recited in claim 1, wherein at least the first supporting surface and the first counter-surface have geometries which deviate from one another as viewed in the axial direction and which are designed in such a way that the counter-surface exerts a radial pressure on the first supporting surface during the rotary locking.

8. The rotary cutting tool as recited in claim 7, wherein at least the first supporting surface has the geometry of a circular cylinder segment and the first counter-surface has a geometry bulging radially outward relative to a circular cylinder segment as viewed in the axial direction.

9. The rotary cutting tool as recited in claim 1, wherein the first supporting surface has an insertion slope in the rotary locking direction.

10. The rotary cutting tool as recited in claim 1, wherein the locking projection, as viewed in the radial direction, runs in a wedge shape in the circumferential direction toward the locking geometry and/or bears axially against an axial stop surface, running in the circumferential direction, on the shank.

11. The rotary cutting tool as recited in claim 10, wherein the axial stop surface merges into an engagement slope which lies in front of the axial stop surface in the rotary locking direction.

12. The rotary cutting tool as recited in claim 10, wherein the axial stop surface is a section of a step on one of the fingers, said step projecting freely in the circumferential direction.

13. The rotary cutting tool as recited in claim 1, wherein the cutting tip comprises a drill point, wherein the second supporting surface lies closer to the drill point than the first supporting surface, and wherein the cutting tip has an axial supporting pin, on which a first stop surface is provided.

14. The rotary cutting tool as recited in claim 13, wherein a centering pin provided with a smaller diameter than the supporting pin projects from the supporting pin on the rear side.

15. The rotary cutting tool as recited in claim 1 wherein the first supporting surface merges into the second supporting surface with a sloping step.

16. The rotary cutting tool as recited in claim 1 wherein the first supporting surface and the second supporting surface are disposed at different radial distances from a central axis of the cutting tool.

17. The rotary cutting tool as recited in claim 16 wherein the second supporting surface is disposed a greater radial distances from the central axis than the first supporting surface.

18. A rotary cutting tool comprising:
a shank; and
an interchangeable cutting tip which can be coupled to the shank in a form-fitting manner,
wherein the shank has a locking geometry having an undercut against a direction of rotation, into which undercut a locking projection of the cutting tip projects in order to secure the cutting tip axially to the shank;
wherein the shank has a lateral, inward facing, first supporting surface lying axially offset from the locking geometry and a lateral, inward facing, second supporting surface lying axially in the region of the locking geometry, against which supporting surfaces a first counter-surface and a second counter-surface, respectively, of the cutting tip bear with an interference fit; and
wherein at least one of the supporting surfaces is formed by a plurality of supporting sections circumferentially separate from one another and/or at least one of the counter-surfaces is formed by a plurality of counter-sections circumferentially separate from one another.

19. A rotary cutting tool comprising:
a shank; and
an interchangeable cutting tip which can be coupled to the shank in a form-fitting manner, the cutting tip comprising a drill point,
wherein the shank has a locking geometry having an undercut against a direction of rotation, into which undercut a locking projection of the cutting tip projects in order to secure the cutting tip axially to the shank;
wherein the shank has a lateral, inward facing, first supporting surface lying axially offset from the locking geometry and a lateral, inward facing, second supporting surface lying axially in the region of the locking geometry, against which supporting surfaces a first counter-surface and a second counter-surface, respectively, of the cutting tip bear with an interference fit;
wherein the second supporting surface lies closer to the drill point than the first supporting surface; and
wherein the cutting tip has an axial supporting pin, on which a first stop is provided.

20. A rotary cutting tool comprising:
a shank; and an interchangeable cutting tip which can be coupled to the shank in a form-fitting manner, wherein the shank has a locking geometry having an undercut against a direction of rotation, into which undercut a locking projection of the cutting tip projects in order to secure the cutting tip axially to the shank;

wherein the shank has a lateral, inward facing, first supporting surface lying axially offset from the locking geometry and a lateral, inward facing, second supporting surface lying axially in the region of the locking geometry, against which supporting surfaces a first counter-surface and a second counter-surface, respectively, of the cutting tip bear with an interference fit; and wherein the first supporting surface merges into the second supporting surface with a sloping step.

21. A rotary cutting tool comprising:

a shank; and an interchangeable cutting tip which can be coupled to the shank in a form-fitting manner, wherein the shank has a locking geometry having an undercut against a direction of rotation, into which undercut a locking projection of the cutting tip projects in order to secure the cutting tip axially to the shank;

wherein the shank has a lateral, inward facing, first supporting surface lying axially offset from the locking geometry and a lateral, inward facing, second supporting surface lying axially in the region of the locking geometry, against which supporting surfaces a first counter-surface and a second counter-surface, respectively, of the cutting tip bear with an interference fit; and wherein the first supporting surface and the second supporting surface are disposed at different radial distances from a central axis of the cutting tool.

* * * * *